Nov. 20, 1951
A. G. COOLEY
2,575,442
FACSIMILE CONTROL MECHANISM FOR EFFECTING CURVILINEAR SCANNING OR RECORDING
Filed Feb. 28, 1946
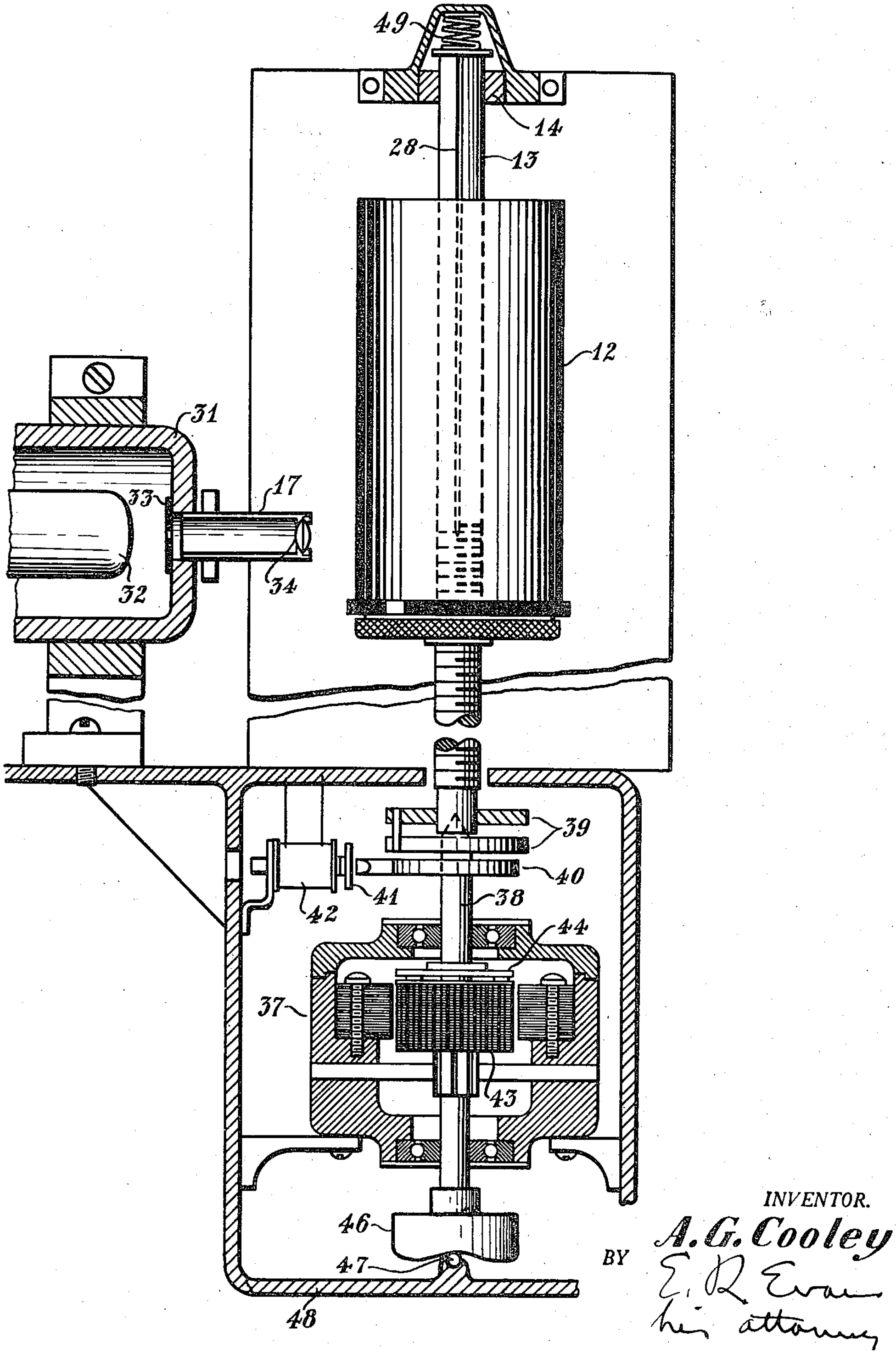
INVENTOR.
A. G. Cooley
BY E. R. Evans
his attorney Patented Nov. 20, 1951

2,575,442

UNITED STATES PATENT OFFICE 2,575,442

FACSIMILE CONTROL MECHANISM FOR EFFECTING CURVILINEAR SCANNING OR RECORDING

Austin G. Cooley, New York, N. Y., assignor to Times Facsimile Corporation, New York, N. Y., a corporation of New York Application February 28, 1946, Serial No. 650,900

2 Claims. (Cl. 346—138)

This invention relates to telefacsimile systems and apparatus, and more particularly to a control mechanism for facsimile machines for effecting curvilinear scanning or recording.

As is well known, facsimile transmission involves the scanning of elemental areas of the copy or picture to be transmitted and the utilization of the transmitted signals, corresponding to the respective elemental areas of the picture, for reproducing a facsimile at the receiving station by a synchronized scanning process. The receiving process involves marking or exposing the receiving medium at points or elemental areas in the proper spatial relation in order that the copy may be an accurate facsimile of the original. It has been customary to maintain the facsimile transmitting and receiving machines operating at a uniform scanning rate along a rectilinear scanning path in order to avoid distortion and defects such as "recording patterns" resulting from speed variations of the driving units and from mechanical imperfections.

In certain applications of facsimile however, it is advantageous to modify this principle of construction and utilize either variable-rate scanning or curvilinear scanning. Since transmitters of this type will only work properly with receivers of the same type, the transmission can be confined to designated receivers and if the designed distortion is sufficiently great, the transmission can be secret. In other words, photographs may be transmitted in such distorted form that they will not be of any utility when received by an unauthorized party, or in the case of wide range "scrambling" of the copy, a high degree of secrecy may be attained which is often desirable in the transmission of messages or maps. Where secrecy of transmission is required, as distinguished from the lesser degree of distortion required for rendering photographs useless, it is extremely desirable to provide a machine embodying both variable-rate scanning and curvilinear scanning.

Since the reproduction of a facsimile based on uniform rectilinear scanning is recognized as comparatively difficult, involving precision machine work and extremely accurate synchronization, it will be evident that facsimile reproduction with non-uniform scanning represents much greater problems. It is the object of the present invention, in general terms, to provide a scanning and driving mechanism for apparatus of the character referred to, by the use of which it is possible to obtain wide-range distortion in facsimile transmission, and accurate and substantially perfect correction of the distortion at the receiver.

Another object of the invention is to provide improved copy-positioning scanning means for facsimile or other apparatus which includes a rotary copy-holding member.

A still further object of the invention is to improve the drum driving and feeding mechanism of a facsimile machine of the drum type.

Other objects and advantages of the invention will appear from the following description of the preferred embodiment thereof shown in the accompanying drawing, wherein the single figure is a side elevational view, partly in section, of a cam mechanism for controlling the rotating drum of a facsimile machine of the drum type.

Referring to the drawing, the facsimile machine shown for the purpose of explaining the invention comprises a rotary drum 12 for supporting the copy to be transmitted or the recording sheet (when receiving). The drum is preferably mounted with its axis substantially vertical or perpendicular to the base of the machine. The drum is carried by a vertical or inclined rotatable leadscrew 13 so that the drum may slide downwards along the leadscrew with a minimum of frictional retardation. The rotatable leadscrew is supported in a bearing 14 at its upper end, the screw being urged in a downward direction by a compressing spring 49.

The scanning arrangement shown includes an optical system having a lens barrel 17 adapted to scan the copy or project the light from a recording lamp 32 through an aperture plate 33 and lens 34 to a light-sensitive recording sheet clamped on the drum 12. The recording lamp 32 is mounted in a casing 31 in a conventional manner. The scanning optical system shown is intended to represent any suitable facsimile scanning arrangement as usually employed with drum-type machines, either of the transmitting or receiving type. The detailed scanning arrangement forms no part of the present invention, which relates to improved means for effecting curvilinear scanning by oscillating the drum 12 as it rotates.

The drum 12 is provided with bearings so that it slides on the leadscrew 13 and also a key (not shown) engaging the keyway 28 in the leadscrew. The drum is also provided at the lower end thereof with a threaded nut (not shown) engaging the threaded portion of the leadscrew 13 so that as the leadscrew rotates the drum not only rotates with it but also feeds past the scanning mechanism. The detailed construction of the drum and leadscrew except as hereinafter described may be similar to that shown in my prior Patent No. 2,138,784, dated November 29, 1938.

In order to effect scrambling of the copy, the copy may be scanned at a variable rate as described in my prior Patent No. 2,404,566, dated July 23, 1946, as well as along a curvilinear scanning path. As shown, the leadscrew and drum driven by a motor 37, which may be energized from a variable-frequency generator as described in my co-pending application, Ser. No. 590,369, filed April 26, 1945, now Patent No. 2,513,402, dated July 4, 1950, whereby a random-pattern variable-speed operation is obtained which can be duplicated in one or more similarly controlled receivers which have to be synchronized with the transmitter. In this manner, secrecy is obtained by predetermined, random distortion of the transmitted signals.

The motor 37 is mounted at one end of the leadscrew 13 with the shaft 38 in axial alignment with the screw. The shaft is rigidly secured to one end of the leadscrew 13, as by means of collars 39, mounted respectively on the leadscrew and motor shaft, and pinned together as shown. The motor shaft 38 in the embodiment shown, is also provided with a stop or latch member 40 provided with a projecting arm adapted to engage the armature 41 of the latch magnet 42. Thus, if the latch magnet is de-energized, the engagement of the armature 41 with the rotating latch member 40 stops the leadscrew and drum in a pre-determined annular position for the purpose of phasing the machine without stopping the motor. A slip-friction clutch 44 is arranged between the rotor 43 of the motor and the motor shaft 38 whereby the rotor may continue to rotate even when the drum 12 and motor shaft 38 are stopped by the latch 41. When the latch is retracted to release the motor shaft, said shaft and the attached drum 12 are driven by the rotor 43 in synchronism with the applied motor current to maintain the drum in synchronism with the remote machine.

It will be apparent that if the frequency of the current applied to the motor varies, the speed of the motor and drum 12 will vary accordingly. The motor shown is of the phonic-wheel type wherein the rotor follows the variations in the frequency of the current impressed upon the field coils, and may be similar to that shown in my prior Patents Nos. 2,257,158, granted September 30, 1941, and 2,276,936, granted March 17, 1942.

In order to obtain both curvilinear scanning and either constant or variable-rate scanning, an oscillatory lengthwise movement is imparted to the drum 12 in the direction of the feeding movement so that the scanning is curvilinear over the surface of the copy secured on the rotating drum. As shown, this is accomplished by mounting the leadscrew 13 and motor shaft 38 in a manner to permit axial reciprocating motion and providing means to effect a predetermined axial displacement of the drum during each revolution thereof. This displacement is preferably obtained by means of a cam engaging one of the elements of the scanning system or the supporting means therefor. A preferred construction comprises a cylindrical cam 46 at the lower end of the substantially vertical motor shaft and attached leadscrew, the cam engaging a hardened ball or point 47 rigidly supported on the frame 48. The motor shaft 38 slides freely in the end bearings of the motor 37 and similarly the leadscrew 13 slides freely in the bearing 14 at the upper end of the frame. The compression spring 49 insures contact between the cam 46 and the ball 47 during the entire rotation of the leadscrew and drum. The rotor 43 of the motor is preferably of such length, as shown, that a magnetic path of low reluctance is provided with the stationary field laminations at all positions of the reciprocatory up-and-down movement of the drum, the character of which depends solely upon the profile of the cam 46. Consequently, by using accurate sets of duplicated cams, the curvilinear scanning movement can be precisely duplicated at each of two or more machines when identical cams are properly mounted in the respective machines. Replaceable cams of different contours may be employed as is customary in cam mechanisms, for changing the coding of the mechanism. It is found that simultaneously varying the scanning along the scanning line and also transversely greatly enhances the degree of secrecy obtained in the transmission of confidential or secret subject matter. In some instances, only curvilinear scanning distortion may be employed in transmission.

While a single embodiment of the invention has been described in detail for the purpose of explaining the underlying principles, various modifications of the same may be made without departing from the scope of the invention.

I claim:

1. A facsimile machine for curvilinear scanning of copy comprising a rotary drum having an upright axis, means for clamping the copy or recording sheet to the drum to rotate therewith, a vertical lead screw engaging the drum to feed the same at a uniform rate along its vertical axis, motor means for rotating the lead screw and drum, said motor means having a rotatable and longitudinally movable motor shaft in alignment with said lead screw and coupled thereto, and means including a cam on said motor shaft for oscillating the lead screw and drum with the same vertical displacement thereof during each rotation.

2. A facsimile machine of the curvilinear scanning type comprising a rotatable drum, means for clamping the copy or recording sheet to said drum to rotate therewith, driving means for rotating said drum, a cylindrical cam mounted coaxial with said drum and means including said cam for oscillating the drum back and forth along its axis during each revolution thereof.

AUSTIN G. COOLEY.

REFERENCES CITED

The following references are of record in the file of this patent:

UNITED STATES PATENTS

| Number | Name | Date |
|---|---|---|
| 1,325,574 | Nichols | Dec. 23, 1919 |
| 1,851,748 | Belin | Mar. 29, 1932 |
| 1,910,540 | Hammond | May 23, 1933 |
| 2,315,362 | Wise et al. | Mar. 30, 1943 |
| 2,404,566 | Cooley | July 23, 1946 |
| 2,425,076 | Young | Aug. 5, 1947 |